(12) United States Patent
Evans, V et al.

(10) Patent No.: US 9,813,623 B2
(45) Date of Patent: Nov. 7, 2017

(54) WIDE FIELD OF VIEW CAMERA FOR INTEGRATION WITH A MOBILE DEVICE

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/336,689

(22) Filed: Oct. 27, 2016

(65) Prior Publication Data

US 2017/0163889 A1 Jun. 8, 2017

Related U.S. Application Data

(60) Provisional application No. 62/249,130, filed on Oct. 30, 2015, provisional application No. 62/300,631, (Continued)

(51) Int. Cl.
*H04N 5/232* (2006.01)
*H04N 5/225* (2006.01)
(Continued)

(52) U.S. Cl.
CPC ......... *H04N 5/23238* (2013.01); *G02B 13/06* (2013.01); *G02B 27/1066* (2013.01);
(Continued)

(58) Field of Classification Search
CPC ............... H04N 5/23238; H04N 5/265; H04N 5/23206; H04N 5/2258; H04N 5/217;
(Continued)

(56) References Cited

U.S. PATENT DOCUMENTS 6,583,815 B1 6/2003 Driscoll et al.
6,795,113 B1 9/2004 Jackson et al.
(Continued)

FOREIGN PATENT DOCUMENTS

WO 2014106296 A1 7/2014

OTHER PUBLICATIONS

International Search Report and Written Opinion in PCT/US16/59497 mailed Jan. 17, 2017, 10 pages.
(Continued)

*Primary Examiner* — Padma Haliyur
(74) *Attorney, Agent, or Firm* — Perkins Cole LLP

(57) ABSTRACT

Disclosed herein are various embodiments of an imaging device having a wide field of view configured to connect to another device. According to one embodiment, the wide field of view camera can include an array of cameras for recording a wide view (e.g., 360° view) of the surrounding environment and generate a 360° image of the surrounding environment. The wide field of view camera can be configured to connect and/or attach to another device, including a mobile device. Embodiments include a wired or wireless connection mechanism to facilitate communication between the wide field of view camera and another device. The connection mechanism may enable transmission of data associated with the wide field of view camera to another device. Embodiments include an attachment mechanism to fasten the wide field of view camera to another device.

26 Claims, 15 Drawing Sheets

Related U.S. Application Data filed on Feb. 26, 2016, provisional application No. 62/317,467, filed on Apr. 1, 2016, provisional application No. 62/380,250, filed on Aug. 26, 2016.

(51) Int. Cl.
| | | |
|---|---|---|
| *H04N 5/265* | (2006.01) | |
| *H04N 5/217* | (2011.01) | |
| *G02B 27/10* | (2006.01) | |
| *G02B 13/06* | (2006.01) | |
| *G06F 3/0481* | (2013.01) | |

(52) U.S. Cl.
CPC ........... *H04N 5/217* (2013.01); *H04N 5/2253* (2013.01); *H04N 5/2257* (2013.01); *H04N 5/2258* (2013.01); *H04N 5/23206* (2013.01); *H04N 5/23216* (2013.01); *H04N 5/265* (2013.01); *G06F 3/04817* (2013.01)

(58) Field of Classification Search
CPC ............. H04N 5/23216; H04N 5/2257; H04N 5/2253; G02B 27/1066; G02B 13/06; G06F 3/04817
See application file for complete search history.

(56) References Cited

U.S. PATENT DOCUMENTS

| | | | |
|---|---|---|---|
| 6,954,310 B2* | 10/2005 | Holloway | G02B 13/06 348/335 |
| 7,646,404 B2 | 1/2010 | Liu et al. | |
| RE43,490 E | 6/2012 | Gullichsen et al. | |
| 8,730,299 B1 | 5/2014 | Kozko | |
| 8,818,101 B1 | 8/2014 | Lim | |
| 9,055,220 B1 | 6/2015 | Kozko | |
| 9,152,019 B2 | 10/2015 | Kintner et al. | |
| 9,521,321 B1 | 12/2016 | Kozko et al. | |
| 2004/0061787 A1 | 4/2004 | Liu et al. | |
| 2005/0058360 A1 | 3/2005 | Berkey et al. | |
| 2006/0056056 A1 | 3/2006 | Ahiska et al. | |
| 2007/0236595 A1 | 10/2007 | Pan et al. | |
| 2008/0024594 A1 | 1/2008 | Ritchey et al. | |
| 2009/0002797 A1 | 1/2009 | Kwong et al. | |
| 2010/0002071 A1 | 1/2010 | Ahiska | |
| 2010/0033551 A1 | 2/2010 | Agarwala et al. | |
| 2010/0045773 A1 | 2/2010 | Ritchey et al. | |
| 2010/0097442 A1 | 4/2010 | Lablans et al. | |
| 2010/0119172 A1 | 5/2010 | Yu et al. | |
| 2011/0002544 A1 | 1/2011 | Oshima | |
| 2011/0032368 A1 | 2/2011 | Pelling et al. | |
| 2011/0211040 A1 | 9/2011 | Lindemann et al. | |
| 2012/0044391 A1 | 2/2012 | Ni et al. | |
| 2012/0169842 A1 | 7/2012 | Chuang et al. | |
| 2012/0242788 A1 | 9/2012 | Chuang et al. | |
| 2012/0257008 A1 | 10/2012 | Taylor et al. | |
| 2013/0258044 A1 | 10/2013 | Betts-Lacroix et al. | |
| 2013/0278715 A1 | 10/2013 | Nutsch et al. | |
| 2013/0321569 A1 | 12/2013 | Agarwala et al. | |
| 2013/0329002 A1 | 12/2013 | Tico | |
| 2014/0002588 A1 | 1/2014 | Ahiska | |
| 2014/0049609 A1 | 2/2014 | Wilson et al. | |
| 2014/0210940 A1 | 7/2014 | Barnes | |
| 2014/0267586 A1 | 9/2014 | Aguilar et al. | |
| 2014/0267596 A1 | 9/2014 | Geerds et al. | |
| 2014/0313377 A1 | 10/2014 | Hampton et al. | |
| 2015/0212653 A1 | 2/2015 | Cable et al. | |
| 2015/0103197 A1 | 4/2015 | Djordjevic et al. | |
| 2015/0189140 A1 | 7/2015 | Sutton et al. | |
| 2015/0244930 A1 | 8/2015 | Ettinger et al. | |
| 2015/0358539 A1 | 12/2015 | Catt | |
| 2015/0373279 A1* | 12/2015 | Osborne | G02B 13/0075 348/36 |
| 2016/0073104 A1 | 3/2016 | Hillebrand et al. | |
| 2016/0088280 A1 | 3/2016 | Perdices-Gonzalez et al. | |
| 2016/0198087 A1 | 7/2016 | Georgiev | |
| 2016/0219217 A1 | 7/2016 | Williams et al. | |
| 2016/0360104 A1 | 12/2016 | Zhang et al. | |
| 2017/0126971 A1 | 5/2017 | Evans et al. | |
| 2017/0126972 A1 | 5/2017 | Evans et al. | |

OTHER PUBLICATIONS

International Search Report and Written Opinion in PCT/US16/59535 mailed Jan. 17, 2017, 12 pages.
Partial Search Report PCT/US16/59170 mailed Mar. 7, 2017, 2 pages.
Final Office Action Mailed Mar. 21, 2017, in U.S. Appl. No. 15/161,153 of Evans V et al., filed May 20, 2016, 21 pages.
International Report and Written Opinion dated May 19, 2017, for International Application No. PCT/US16/59170 dated May 19, 2017.
U.S. Appl. No. 15/675,660 of Evans V et al. filed Aug. 11, 2017.
U.S. Appl. No. 15/604,544 of Evans V et al. filed May 24, 2017.
Office Action dated Jun. 8, 2017 for Taiwanese Patent Application No. 105134935, 16 pages.
Advisory Action dated Jun. 2, 2017, in U.S. Appl. No. 15/161,153 of Evans et al., filed May 20, 2016.
Non-Final Office Action dated Sep. 14, 2016, for U.S. Appl. No. 15/161,153 of Evans et al., filed May 20, 2016.
Notice of Allowance dated Aug. 14, 2017 for U.S. Appl. No. 15/336,588 of Evans V et al., filed Oct. 27, 2016.
Restriction Requirement dated Jul. 27, 2016, for U.S. Appl. No. 15/161,153 of Evans et al., filed May 20, 2016.
Restriction Requirement dated Mar. 2, 2017, for U.S. Appl. No. 15/336,588 of Evans et al., filed Oct. 27, 2016.
Non-Final Office Action dated May 12, 2017 in U.S. Appl. No. 15/336,588 of Evans et al., filed Oct. 27, 2016, 9 pages.

* cited by examiner

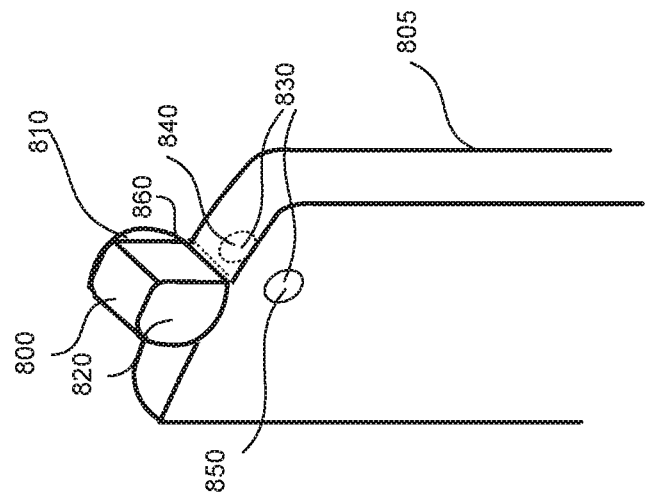
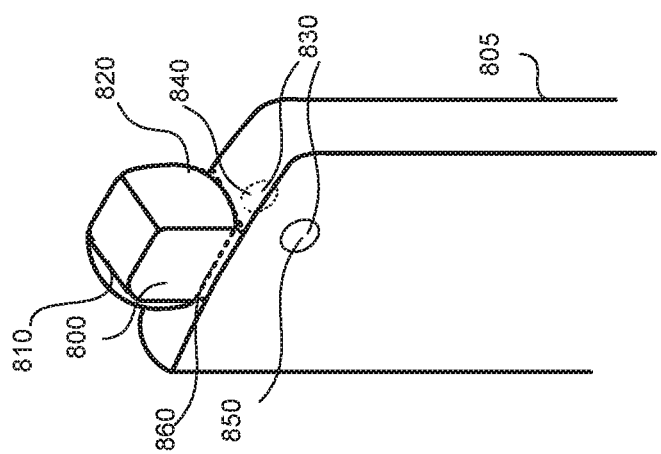

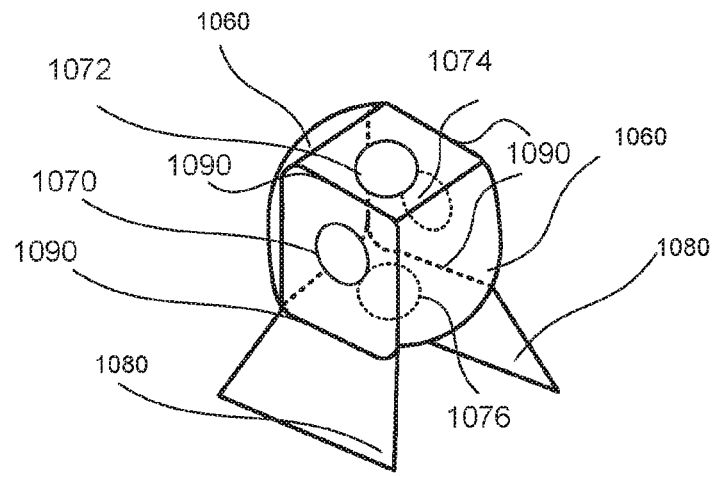
*FIG. 10B*
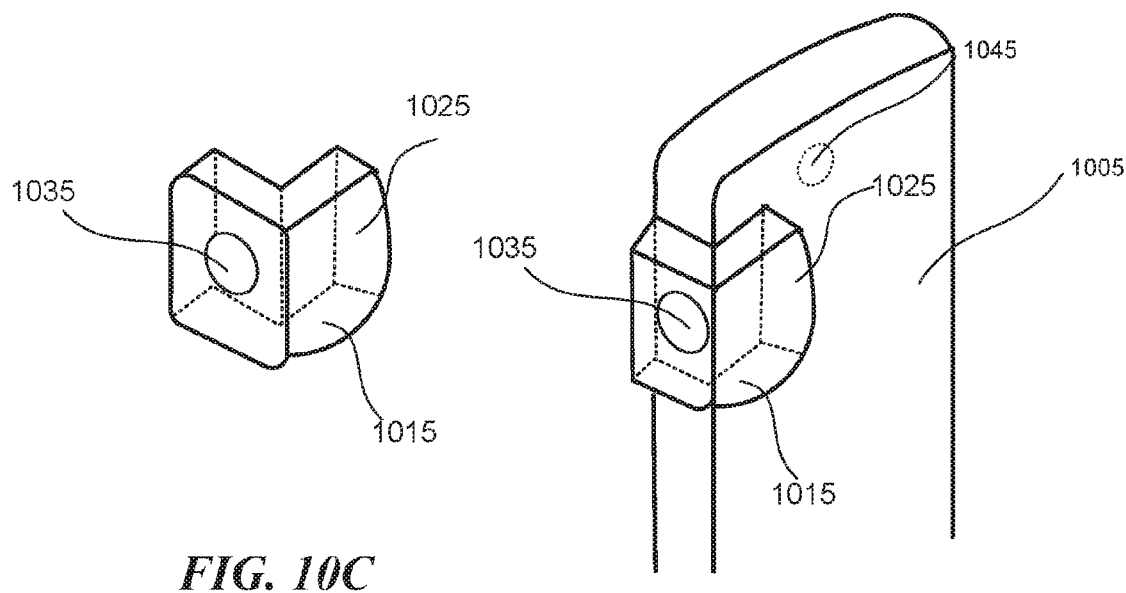
*FIG. 10C*
*FIG. 10D*

WIDE FIELD OF VIEW CAMERA FOR INTEGRATION WITH A MOBILE DEVICE

CROSS-REFERENCE TO RELATED APPLICATIONS

This application claims priority to and the benefit of U.S. Provisional Patent Application Ser. No. 62/249,130, entitled "MOBILE DEVICES AND MOBILE DEVICE ACCESSORIES" filed Oct. 30, 2015, U.S. Provisional Patent Application Ser. No. 62/300,631, entitled "MOBILE DEVICES AND MOBILE DEVICE ACCESSORIES" filed Feb. 26, 2016, U.S. Provisional Patent Application Ser. No. 62/317,467, entitled "APPARATUS AND METHOD FOR A WIDE FIELD OF VIEW CAMERA" filed Apr. 1, 2016, and U.S. Provisional Application 62/380,250, entitled "A WIDE FIELD OF VIEW CAMERA FOR INTEGRATION WITH A MOBILE DEVICE" filed Aug. 26, 2016, which applications are herein incorporated by reference in their entireties.

TECHNICAL FIELD

The present application is related to a wide field of view camera and, more specifically, to a wide field of view camera configured for integration with a mobile device.

BACKGROUND

Commonplace cameras today include directional cameras that record an image of the environment from one direction, such as a front facing camera or a back facing camera of a mobile device. A conventional camera on a mobile device has a limited field of view, and small digital cameras on mobile devices can have a crop factor several times smaller than 35 mm film format.

SUMMARY

Disclosed here are various embodiments of a wide field of view camera configured for integration with a mobile device. According to one embodiment, the wide field of view camera can include an array of cameras for recording a wide view (e.g., 360° view) of the surrounding environment and generate a 360° image of the surrounding environment. The wide field of view camera can be configured to connect and/or attach to a mobile device. Embodiments include a wired or wireless connection mechanism to facilitate communication between the wide field of view camera and another device. The connection mechanism can enable transmission of data associated with the wide field of view camera to another device. Embodiments include an attachment mechanism to fasten the wide field of view camera to another device.

BRIEF DESCRIPTION OF THE DRAWINGS

FIGS. 8A-8B show an imaging device capable of recording an undistorted full view of a surrounding environment, according to one embodiment.

FIG. 10B shows an imaging device configured to connect to another device, according to one embodiment.

FIGS. 10C-10D show an imaging device configured to connect and/or attach to another device, according to one embodiment.

DETAILED DESCRIPTION

Disclosed here are various embodiments of a wide field of view imaging and embodiments for configuring a wide field of view imaging device to connect and/or attach to another device. According to one embodiment, an array of cameras is placed on a sphere, where each camera records a portion of the surrounding 360° environment. A processor executes a program to identify and correct distortions in an image, assemble images from all the cameras, and create a single wide view (e.g., 360° view) of the environment. The processor can be located within the imaging device and/or within another device. The wide field of view camera can output data associated with the images to another device (e.g., a mobile device).

In another embodiment, multiple wide angle lenses guide light rays into internal camera optics to form multiple images corresponding to the multiple wide angle lenses, on a single photo sensor array. Again, a processor executes a program to identify and correct distortions in an image, and creates a wide view (e.g., 360° view) of the environment. The wide field of view camera can output data associated with the images to another device (e.g., a mobile device).

In various embodiments disclosed herein, a resulting view of the environment can be a static image or a video. The resulting view can be a two-dimensional or a three-dimensional representation of the environment. To obtain a three-dimensional representation of the environment, such as a stereoscopic image, or a stereoscopic video, various 360° cameras disclosed here can be combined to simultaneously record an image of the environment from different points of view. In another embodiment, a three-dimensional representation of the environment, such as a stereoscopic image, or a stereoscopic video, can be generated by positioning a single imaging device including the 360° cameras disclosed herein in different locations to obtain different points of view.

In an embodiment, the imaging device can be configured to connect and/or attach to another device. The imaging device can include a connection mechanism to facilitate communication between the imaging device and another device. The connection mechanism can include a wired or wireless connection, such as, for example, USB connector, Bluetooth device, WI-FI device, etc. The imaging device can include an attachment mechanism to fasten the imaging device to another device. The attachment mechanism can include an opening to receive another device, a compression device, etc. Various embodiments of configuring the imaging device to connect and/or attach to another device are discussed below with reference to FIGS. 7-13B.

Imaging Device

Figure 1B:
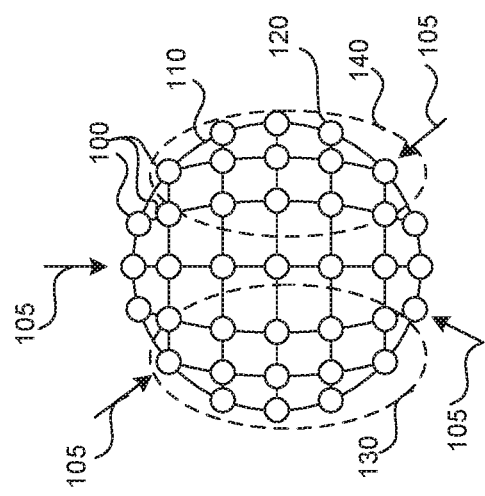
FIGS. 1A-1B show an imaging device to record a wide field of view of the environment, according to one embodiment.
Figure 1A:
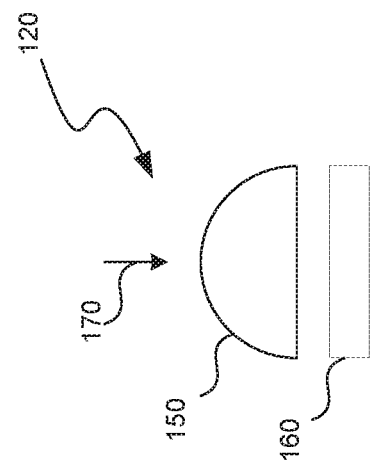

FIGS. 1A-1B show an imaging device to record a wide field of view of the environment, according to one embodiment. The imaging device comprises an array of cameras 100 disposed on a curved three-dimensional surface 110. In FIG. 1, for economy, only several of the array of cameras 100 are labeled. The array of cameras 100 includes a plurality of cameras 120. The array of cameras 100 receives a plurality of light beams 105 from a wide angle view (e.g., a 360° view). The curved three-dimensional surface 110 can take on any shape, such as an ellipsoid, a spheroid, a sphere, a cube with rounded edges, or any three-dimensional shape. Some shapes, for example, a shape with sharp edges or concave surfaces, can hinder certain viewing angles. Preferred embodiments include shapes with no sharp edges or concave surfaces.

The cameras 100 substantially covers the curved three-dimensional surface 110. The cameras 100 can be disposed on the curved three-dimensional surface 110 in a variety of ways: the cameras 100 can be uniformly distributed on the curved three-dimensional surface 110; the cameras 100 can be placed at the intersection of uniformly distributed longitude and latitude lines; the cameras 100 can be more densely distributed in the areas of interest, for example, in the front facing region 130 and/or the back facing region 140; etc. In an embodiment, camera density can be adjustable by enabling one or more cameras to move by, for example, including the one or more cameras on a track running along a length of the curved three-dimensional surface 110 and mechanically connecting the one or more cameras to an actuator. Increasing camera distribution density can improve picture quality by focusing additional cameras on an area of interest, such as, for example, a detected facial impression.

Embodiments include enabling movement of a plurality of cameras based on, for example, activity and/or inactivity of any of the plurality of cameras. For example, an array of lenses can be movably disposed inside a camera port of the ellipsoid substrate. For example, the array of lenses can be configured, in response to the plurality of photo sensors being inactive, to retract inside the camera port, and to align with an outer surface of the ellipsoid substrate. In another example, the array of lenses can be configured, in response to the plurality of photo sensors being active, to protrude out of the outer surface of the ellipsoid substrate, and to position the plurality of lenses to receive light unobstructed by the ellipsoid substrate. A processor connected to the cameras can control movement of the cameras.

The array of cameras 100 can be disposed on a curved substrate. In one embodiment, the curved substrate matches the shape of the curved three-dimensional surface 110. In another embodiment, a plurality of curved substrates whose curvature does not match the curvature of the three-dimensional surface 110 can be disposed to substantially cover the three-dimensional surface 110.

In another embodiment, the array of cameras 100 is divided into smaller arrays of cameras, each smaller array of cameras disposed on a planar substrate. The size associated with each planar substrate is configured to be small compared to a curvature associated with the three-dimensional surface. The plurality of small arrays of cameras is placed on the curved three-dimensional surface to substantially cover the surface as described above.

Camera 120 represents a single camera in the array of cameras 100. In FIG. 1B, each camera 120 includes a lens 150 and a photo sensor 160. The lens 150 receives a light beam 170 and focuses the light beam on the photo sensor 160. The lens 150 can be any type of lens, such as a ball lens, a wide angle lens, or a lens having a focal length between an extremely short and an extremely long focal length. The lens 150 can be a small lens, such as a millimeter, micrometer, nanometer, picometer, etc., lens. The photo sensor 160 can be a CMOS sensor, a CCD sensor, or any sensor configured to sense light.

A processor, connected to the array of photo sensors, receives a plurality of images corresponding to the array of photo sensors. The processor creates an image comprising a wide angle view (e.g., a 360° view) of an environment around the imaging device. The processor can be disposed inside the three-dimensional surface, or can be disposed outside the three-dimensional surface. The imaging device described here can be a standalone camera or can be part of another device, such as a mobile device, etc.

Figure 2:
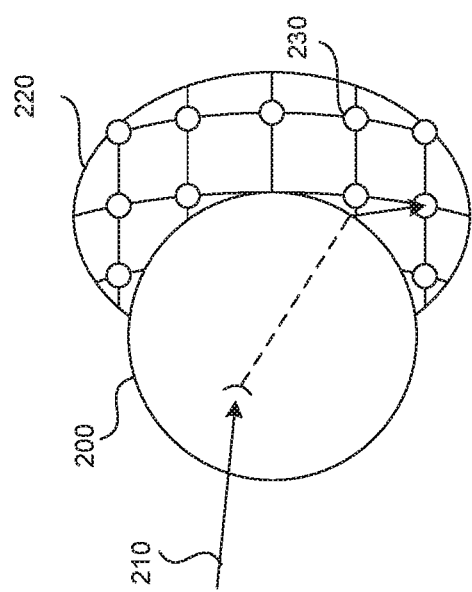
FIG. 2 shows an imaging device to record an approximately 180° view of the environment, according to one embodiment.

FIG. 2 shows an imaging device to record a 180° view of the environment, according to one embodiment. An ellipsoid lens 200, such as a ball lens, focuses a light beam 210 on a curved array of elements 220. Each element 230 in the array of elements 220 can be a camera 120, as described above, or a photo sensor 160 (in FIG. 1B). The curvature of the curved array of elements 220 corresponds to the curvature of the ellipsoid lens 200. For example, the curvature of the curved array of elements is the same as or proportional to the curvature of the ellipsoid lens 200. The curved array of elements 220 can be assembled according to any of the techniques described above.

Figure 3:
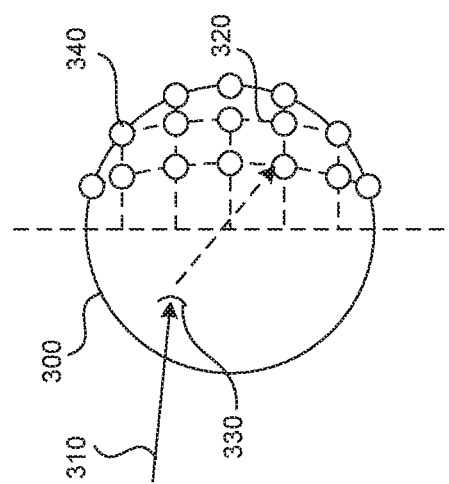
FIG. 3 shows an imaging device to record an approximately 180° view of the environment, according to another embodiment.

FIG. 3 shows an imaging device to record a 180° view of the environment, according to another embodiment. An ellipsoid lens 300, such as a ball lens, focuses a light beam 310 on a curved array of elements 320. Each element 340 in the array of elements 320 can be a camera 120, as described above, or a photo sensor 160 (in FIG. 1B). The array of elements 320 is disposed on half of the ellipsoid lens 300, and the element 340 receives the light beam 310 after the light beam diffracts at the entry point 330. The curved array of elements 320 can be assembled according to any of the techniques described above.

By combining two or more imaging devices disclosed in FIGS. 1-3, a wide view (e.g., 360° view) of the environment can be recorded.

Figure 4:
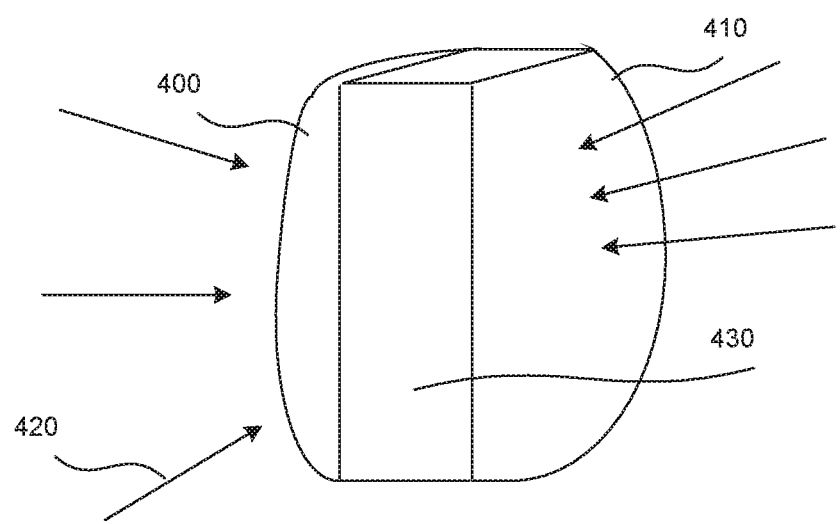
FIG. 4 shows a wide field of view imaging device, according to another embodiment.

FIG. 4 shows a wide field of view imaging device, according to another embodiment. The imaging device includes two wide angle lenses 400, 410 receiving a plurality of light beams 420. For economy, only one light beam 420 is labeled in the figure. Element 430 houses internal optics of the imaging device.

Figure 5A:
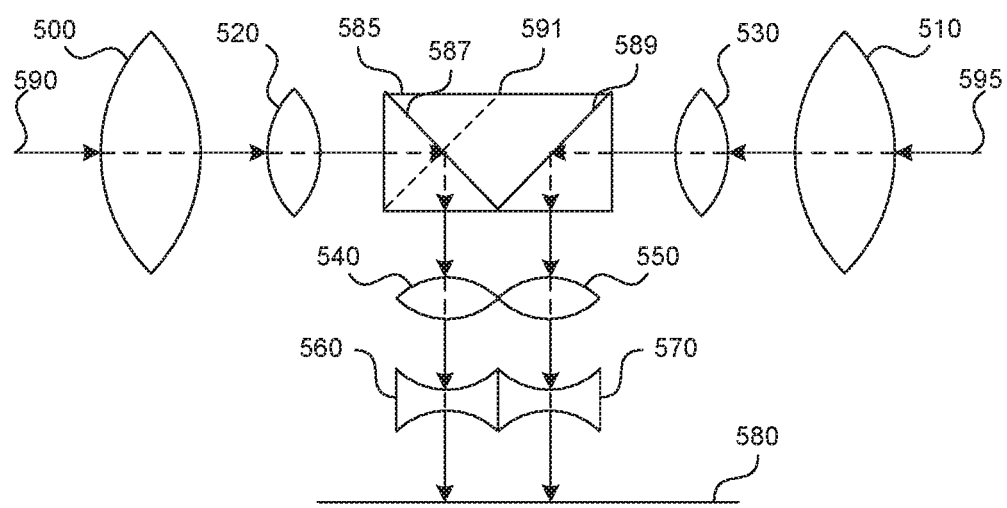
FIG. 5A shows the internal optics of a wide field of view imaging device, according to one embodiment.

FIG. 5A shows the internal optics of a wide field of view imaging device, according to one embodiment. Elements 500 and 510 are wide angle lenses receiving a plurality of light beams 590, 595 from up to 180° around the imaging device. Elements 520 and 530 are convex lenses receiving the plurality of light beams 590, 595 from the plurality of wide angle lenses 500, 510, and focusing a light beam in the plurality of light beams 590, 595 onto a deflector 585.

The deflector 585 receives the plurality of light beams 590, 595 from the first plurality of convex lenses 520, 530, and the deflector 585 changes a direction of the plurality of light beams 590, 595 to direct the plurality of light beams 590, 595 to a second plurality of convex lenses 540, 550. The deflector 585 can be a prism or a mirror. The deflector 585 can be stationary, or it can be actuated by micro-electromechanical systems (MEMS) devices, nano-electromechanical systems (NEMS) devices, pico-electromechanical systems (PENS) devices, etc. For example, the deflector can be a single mirror or prism that changes positions between position 587, deflecting the light beam 590, and position 589, deflecting the light beam 595. In another embodiment, the deflector 585 can assume position 591, deflecting the light beam 595 to the lenses 540, 560, thus obviating the need for lenses 550, 570.

The second plurality of convex lenses 540, 550 receives the plurality of light beams 590, 595 from the deflector 585, and focuses the plurality of light beams 590, 595 onto a plurality of concave lenses 560, 570.

The plurality of concave lenses 560, 570 receives the plurality of light beams 590, 595 from the second plurality of convex lenses 540, 550, and the plurality of concave lenses 560, 570 directs the plurality of light beams 590, 595 to an array of photo sensors 580.

The array of photo sensors 580 receives the plurality of light beams 590, 595 from the plurality of concave lenses 560, 570, and forms a plurality of images corresponding to the first plurality of convex lenses 500, 510. The array of photo sensors 580 can have various sizes, such as 16×9 mm and 4×3 mm.

A processor, connected to the array of photo sensors 580, receives the plurality of images and creates an image comprising a wide view (e.g., 360° view) around the imaging device. Software associated with the processor can identify and correct lens artifacts and/or distortions, and correlates the two images to create a wide angle view (e.g., a 360° view) around the imaging device.

Figure 5B:
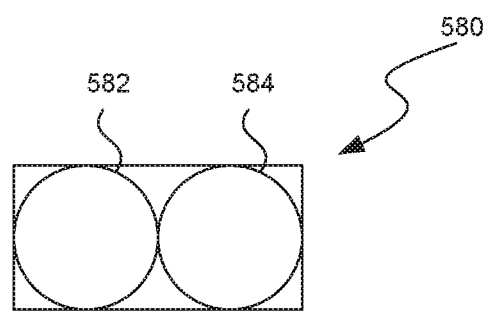
FIG. 5B shows the images formed by the array of photo sensors, according to one embodiment.

FIG. 5B shows the images formed by the array of photo sensors 580, according to one embodiment. The array of photo sensors 580 can form two images 582, 584 corresponding to the two convex lenses 500, 510. The size of the array of photo sensors 580 can be 16×9 mm. In another embodiment, in the case of an actuated deflector 585 assuming positions 587 or 591, the array of photo sensors 580 can form a single image 682, as depicted in FIG. 6B. The single image 682 alternates between corresponding to the image associated with a lens 500, and the image associated with a lens 510.

Figure 6A:
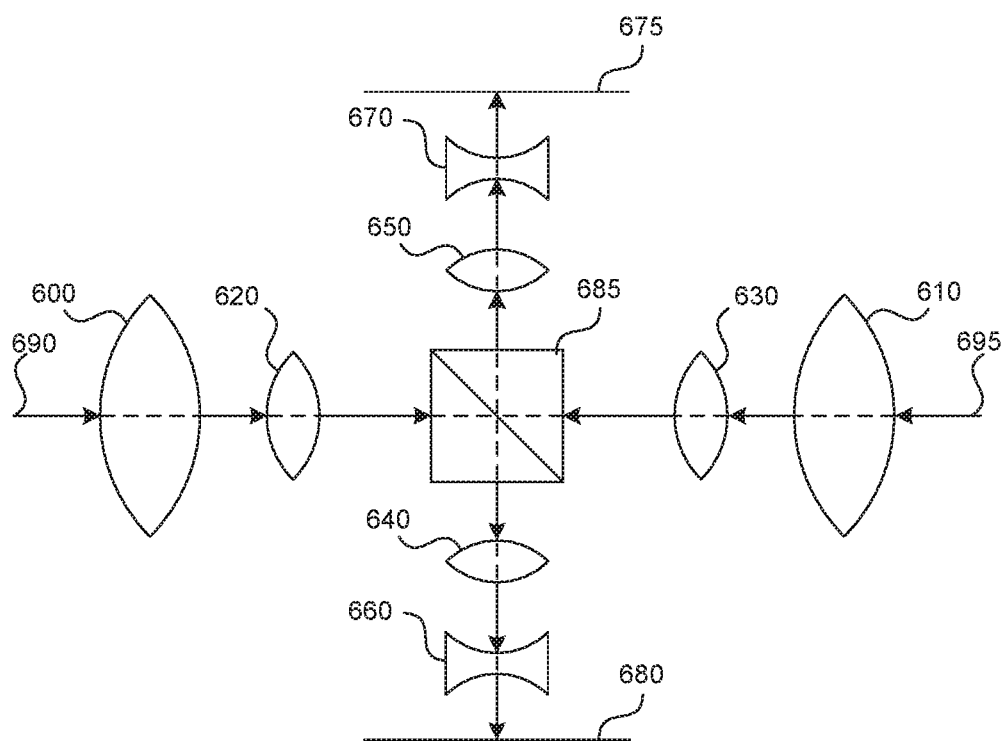
FIG. 6A shows the internal optics of a wide field of view imaging device, according to another embodiment.
Figure 6B:
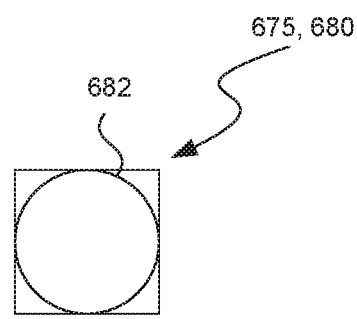
FIG. 6B shows the image formed by the plurality of photo sensor arrays, according to one embodiment.

FIG. 6A shows the internal optics of a wide field of view imaging device, according to another embodiment. Elements 600-630 correspond to the elements 500-530 in FIG. 5A, respectively. Deflector 685 receives the plurality of light beams 690, 695 from the first plurality of convex lenses 620, 630, and the deflector 685 changes a direction of the plurality of light beams 690, 695 to direct the plurality of light beams 690, 695 to a second plurality of convex lenses 640, 650. The deflector 685 can be a prism or a mirror. The deflector 685 can be stationary, or it can be actuated by micro-electromechanical systems (MEMS) devices, nano-electromechanical systems (NEMS) devices, pico-electromechanical systems (PENS) devices, etc.

Similarly to FIG. 5A, the convex lenses 640, 650 and the concave lenses 660, 670 focus the light beams 690, 695 to the plurality of photo sensor arrays 675, 680. The plurality of photo sensor arrays 675, 680 receives the plurality of light beams 690, 695 from the plurality of concave lenses 660, 670 and forms a plurality of images corresponding to the first plurality of convex lenses 600, 610.

FIG. 6B shows the image 682 formed by the plurality of photo sensor arrays 675, 680, according to one embodiment. The plurality of photo sensor arrays 675, 680 can have photo sensors of various sizes, such as 4×3 mm.

To obtain a three-dimensional representation of the environment, such as a stereoscopic image or a stereoscopic video, various 360° cameras disclosed here can be combined to simultaneously record an image of the environment from different points of view. For example, an imaging device disclosed in FIG. 1A can be combined with an imaging device disclosed in FIG. 4 to simultaneously record an image of the environment. In another embodiment, a three-dimensional representation of the environment, such as a stereoscopic image, can be generated by positioning a single device (e.g., an imaging device disclosed in FIG. 1A or an imaging device disclosed in FIG. 4) in a first position followed by placing the device in a second position. A processor, coupled to both of the cameras, can produce a three-dimensional image or a video, based on both of the imaging device recordings.

Method for Configuring Imaging Device

Figure 7:
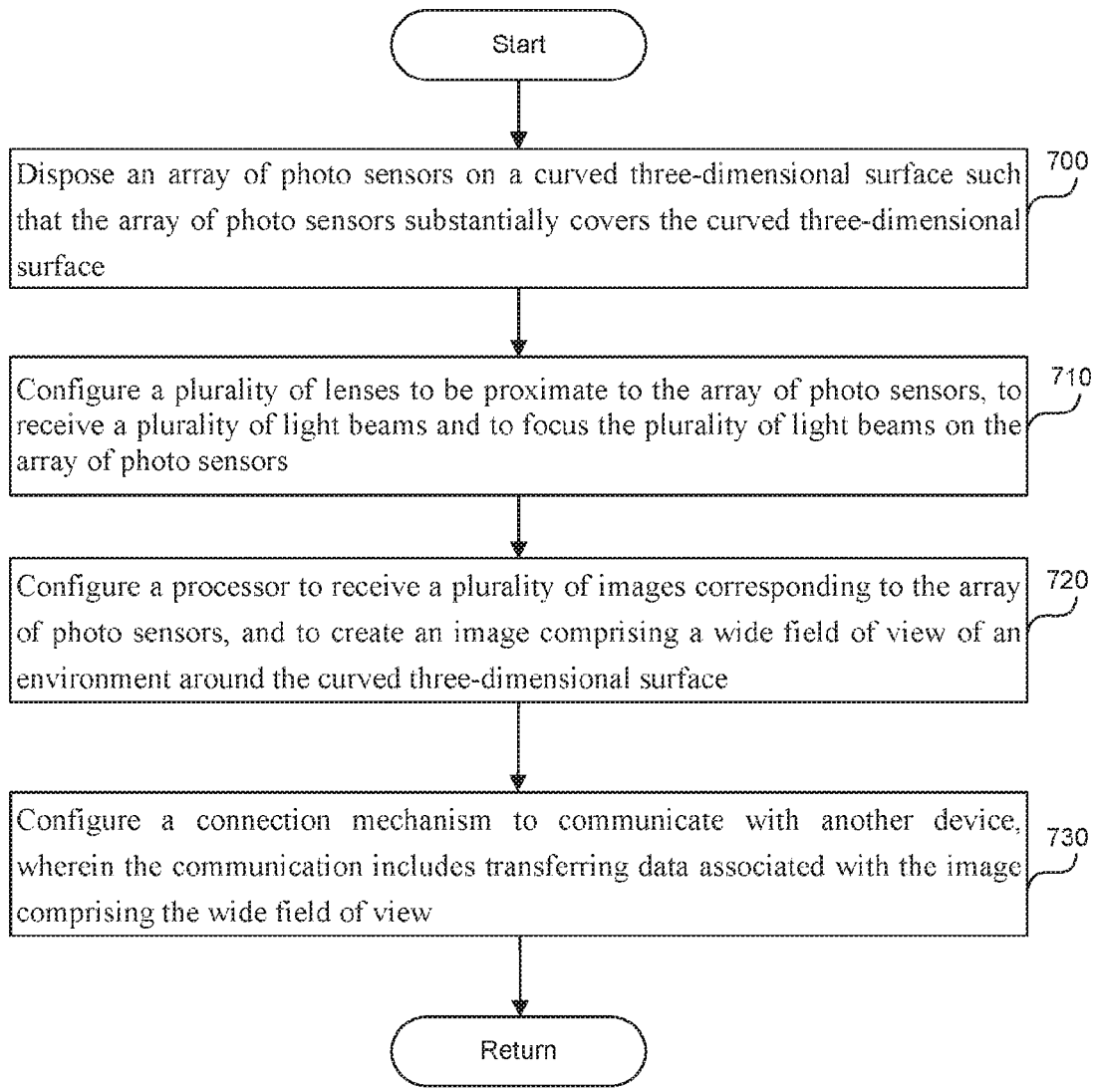
FIG. 7 shows a method of configuring an imaging device to connect with another device, according to one embodiment.

FIG. 7 shows a method of configuring a wide field of view camera to attach and/or connect to another device, according to one embodiment. In step 700, an array of photo sensors is disposed on a curved three-dimensional surface such that the array of photo sensors substantially covers the curved three-dimensional surface. The surface can be an ellipsoid, a spheroid, a sphere, a rounded edge cube, or any other three-dimensional. Some shapes, for example, a shape with sharp edges or concave surfaces, can hinder certain camera viewing angles. Preferred embodiments include shapes with no sharp edges or concave surfaces. The array of photo sensors can be disposed on a planar substrate or on a curved substrate.

In step 710, a plurality of lenses is configured to be proximate to the array of photo sensors, to receive a plurality of light beams and to focus the plurality of light beams on the array of photo sensors. In one embodiment, the correspondence between the array of photo sensors and the lenses is one-to-one. In another embodiment, one convex lens corresponds to one array of photo sensors, where the curvature associated with the convex lens corresponds to the curvature associated with a curved array of photo sensors. The lenses can be ball lenses, wide angle lenses, or lens having a focal length between an extremely short focal length and an extremely long focal length.

The array of photo sensors comprises a plurality of subarrays of photo sensors, the plurality of subarrays of photo sensors having varying density. For example, the array of photo sensors can have higher density in the region of interest, for example, in the front or in the back of the imaging device.

In step 720, a processor, connected to the array of photo sensors, is configured to receive a plurality of images corresponding to the array of photo sensors, and to create an image comprising a wide field of view (e.g., a 360° view) of an environment around the curved three-dimensional surface (e.g., the surface of the imaging device). The imaging device so assembled can be a standalone camera or can be part of another device, such as a mobile device, etc. The processor can be located, for example, within the imaging device, within a mobile device, or a combination thereof. A memory device can be located, for example, within the imaging device, within a mobile device, or a combination thereof. The processor can retrieve and/or store data associated with the plurality of images and/or the wide field of view image in the memory device. A processor within the imaging device and a processor within a mobile device can perform all or part of the image processing steps to create a wide field of view image. A processor within the imaging device can perform one or more imaging processing steps and a processor within a mobile device can perform one or more processing steps. For example, the processor within the imaging device can compress the plurality of images by identifying redundancies in the plurality of images, utilize a connection mechanism to communicate the compressed plurality of images to the processor within the mobile device, and the processor within the mobile device can use the compressed plurality of images to create the wide field of view image (e.g., a 360° view image). In various embodiments, additional steps can be performed to enable the creation of the embodiments described above.

In step 730, a connection mechanism connected to the processor (or plurality of processors) facilitates communication between the imaging device and another device (e.g., a mobile device) where communicating includes transferring data associated with the image comprising the wide field of view to the another device. The connection mechanism can include any wired or wireless connection, or combination of wired and/or wireless connections. Examples of wired connections include a universal serial bus (USB) connector (e.g., 1.0, 2.0, 3.0, 3.1, type-c, mini, micro, etc.), Apple Lightning® connector, or any other computer bus or combination of computer buses. Examples of wireless connections include one or more connections through a personal area network (PAN) device, local area network (LAN) device, wide area network (WAN) device, or any combination of wireless devices. The connection mechanism can operate using standardized communication protocols. Communicating via the connection mechanism can include transmitting and/or receiving data from another device.

In an embodiment, an attachment mechanism can fasten the imaging device to another device. The attachment mechanism can include, for example, an opening to receive the another device, a compression mechanism, a latch, a mobile device case, a handle, a fused surface, or any combination thereof. The attachment mechanism can also include a release mechanism to unfasten the imaging device from the another device. For example, if the attachment mechanism includes a compression mechanism exerting a force on an outer surface of another device to hold the another device in place, the release mechanism can reduce or eliminate the exerted force on the outer surface of the another device. The release mechanism can permit removal of the another device from the imaging device. Embodiments include the attachment mechanism operating in conjunction with the connection mechanism. For example, a USB connection can be position in an opening to receive the another device so that the USB can facilitate a connection with the another device and the combination of the opening and USB connection can fasten the another device in place. In an embodiment, the imaging device can be integrated with another device. For example, a fused surface can attach the imaging device to another device (e.g., a mobile device) and a connection mechanism (e.g., a wired connection) beneath the fused surface can facilitate communication between the imaging device and the another device.

Imaging Device with Connection and/or Attachment Mechanism

FIGS. 8A-8B show an imaging device capable of recording an undistorted wide view (e.g., 360° view) of a surrounding environment, according to one embodiment. In various embodiments, the 360° view includes 360° view around all 3-dimensional axes, X, Y, Z. The imaging device includes a first plurality of cameras 800, and a second plurality of cameras 830.

The first plurality of cameras 800 includes a plurality of wide angle lenses 810, 720, such as fisheye lenses. The plurality of wide angle lenses 810, 820 can be evenly distributed around the first plurality of cameras 800. For example, if the plurality of wide angle lenses 810 comprises two lenses, the two lenses are disposed on opposite sides of the camera. The first plurality of cameras 800 is configured to record a first plurality of images associated with the surrounding environment. Each image in the first plurality of images comprises an image periphery distorted by a wide angle lens in the plurality of wide angle lenses, and an image center undistorted by the wide angle lens.

The second plurality of cameras 830 includes a plurality of lenses 840, 850. The plurality of lenses 840, 850 can be evenly distributed around the second plurality of cameras 830. The plurality of lenses 840, 850 can be distributed to the left and right of the first plurality of cameras 800, and/or to the top and bottom of the first plurality of cameras 800, etc. The plurality of lenses 840, 850 can be any kind of lens from an extremely short effective focal length lens to an extremely long effective focal length lens, for example a normal lens. The second plurality of cameras 830 is configured to record a second plurality of images associated with the surrounding environment. Each image in the second plurality of images comprises an image center undistorted by a camera in the second plurality of cameras, wherein the plurality of image centers associated with the second plurality of images overlaps the plurality of image peripheries associated with the first plurality of images.

In one embodiment, the imaging device includes a swivel 860 configured to rotate the first plurality of cameras 800 and/or the second plurality of cameras 830. The swivel 860 can rotate around one, two, or all three of the 3-dimensional axes. The first plurality of cameras 800 and the second plurality of cameras 830 can rotate with respect to each other, or can rotate with respect to the device on which the first and the second plurality of cameras are mounted. FIG. 8B shows a position in which the first plurality of cameras 800 is rotated with respect to the second plurality of cameras 830, relative to the position shown in FIG. 8A. The swivel 860 can be connected to a motor which automatically rotates the swivel 860. The motor can be a micro-electromechanical systems ("MEMS") device, a nano-electromechanical systems ("NEMS") device, a pico-electromechanical systems device, etc. the motor can be connected to a processor associated with the imaging device, a processor associated with the mobile device 805. In one embodiment, after a first picture is recorded, the motor rotates the swivel 860 anywhere from 0° to 90°, and the cameras 800, 830, record a second picture. In addition, the swivel 860 can include a lock mechanism so that when the swivel 860 rotates the cameras 800 and/or 830 to a desired position, the lock mechanism engages to keep the cameras 800 and/or 830 in place.

The first plurality of cameras 800 and the second plurality of cameras 830 can record the first plurality of images and the second plurality of images synchronously, or asynchronously. The imaging device can include a processor configured to combine the first plurality of images and the second plurality of images into an image undistorted by the plurality of wide angle lenses. The processor can also be associated with the mobile device 805.

The imaging device disclosed herein can be a stand-alone device, can be a mobile device 805 accessory, or can be integrated into the mobile device 805. Further, the first plurality of cameras 800 and/or the second plurality of cameras 830 can be a standalone device, can be a mobile device 805 accessory, or can be integrated into the mobile device 805. The mobile device 805 accessory can connect to the phone via a USB port or wirelessly. When the first plurality of cameras 800 and/or the second plurality of cameras 830 are coupled to the mobile device 805, the cameras 800, 830 can be powered by the mobile device 805, and be communicatively coupled to the processor associated with the mobile device 805, so that the images recorded by the cameras 800, 830 are stored on the mobile device 805. Alternatively, the images recorded by the cameras 800, 830 can be stored in the cameras 800, 830 and sent to the mobile device 805 for processing and/or for display.

Figure 9A:
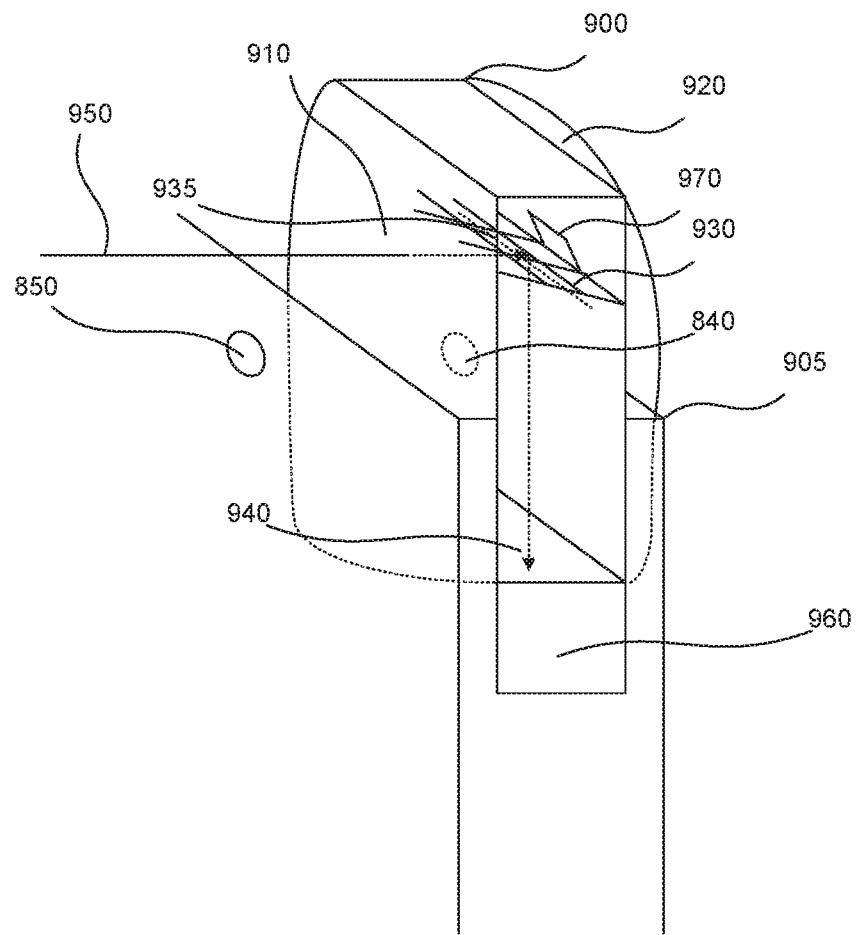
FIG. 9A shows a side view of a partially activated plurality of cameras, according to one embodiment.

FIG. 9A shows a side view of a partially activated plurality of cameras, according to one embodiment. The first plurality of cameras 900 associated with the mobile device 905 includes a first wide angle lens 910, and a second wide angle lens 920, a plurality of photo sensors 940, and an array of light deflectors 930 coupled to the first wide angle lens 910, the second wide angle lens 920, and the plurality of photo sensors 940. The lenses 910, 920 can be fisheye lenses. The array of light deflectors 930 can include one or more light deflectors. The second plurality of cameras can include cameras 850, 840 associated with the mobile device 905.

The first plurality of cameras 900 is operable to, when the first plurality of cameras 900 is inactive, retract inside a camera port 960 associated with the mobile device 905, and align with one or more surfaces associated with an outer casing associated with the mobile device 905, so that the first plurality of cameras 900 becomes unnoticeable when inactive. The first plurality of cameras 900 is operable to, when the camera is active, protrude from the outer casing associated with the mobile device 905, and position the lenses 910, 920 to receive light mostly unobstructed by the mobile device 905.

The array of light deflectors 930 is operable to change a direction of a light beam 950 by changing the position associated with the array of light deflectors 930. The change in the direction of the light beam 950 can be from 0° to 180°. Each light deflector in the array of light deflectors 930 is operable to rotate around an axis 935 associated with the individual light deflector, and to assume at least two positions. The first position is operable to deflect a light beam 950 associated with the first lens 910 to the photo sensors 940 associated with the first plurality of cameras 900. The second position is operable to deflect the light beam associated with the second lens 920 to the photo sensors 940 associated with the first plurality of cameras 900. Each of the light deflectors in the array of light deflectors 930 can rotate independently of each other, or they can rotates in unison. Each of the light deflectors in the array of light deflectors 930 can assume a position different from each other, they can assume the same position, or they can assume a position such that the array of light deflectors 930 creates a smooth surface, such as a plane, or a curved surface. For example, the light deflector 970 has assumed a position different from the rest of the light deflectors in the array of light deflectors 930, thus creating a non-smooth surface.

Each of the light deflectors in the array of light deflectors 930 can be a mirror or a prism operable to reflect light. The array of light deflectors 930 can comprise a mixture of mirror light deflectors and prism light deflectors, or can comprise only mirror light deflectors, or only prism light deflectors. The mirror can be made out of any reflective material, such as glass, reflective plastic, metal, etc. The prism can be a Porro prism, Amici roof prism, pentaprism, etc. The array of light deflectors 930 can be actuated by, or can be a part of a very small device, such as a micro-electromechanical systems ("MEMS") device, a nano-electromechanical systems ("NEMS") device, a pico-electromechanical systems device, etc.

In addition to the first and second lenses 910, 920, as described above, the first plurality of cameras 900 can include a third lens, a fourth lens, and a fifth lens. Each lens can correspond to a side of the first plurality of cameras 900. In addition to the first and second position, as described above, the array of light deflectors 930 is operable to assume a third position, a fourth position, a fifth position, etc., where each position associated with array of light deflectors 930 is configured to deflect a light beam associated with a lens to the photo sensors 940 associated with the first plurality of cameras 900. Any one of the positions associated with a light deflector in the array of light deflectors 930 can deflect the light by 0°, i.e., the array of light deflectors 930 lets the light beam through to the photo sensors 940.

According to one embodiment, the first plurality of cameras 900 can include a lens disposed between the plurality of photo sensors 940 and the array of light deflectors 930. The lens can have an effective focal length between an extremely short effective focal length and an extremely long effective focal length. In another embodiment, the first plurality of cameras 900 can further include a light guide connecting the lenses 910, 920, the array of light deflectors 930, and the plurality of photo sensors 940, where the light guide is operable to transmit the light beam 950 between the lenses 910, 920 and the lens. The light guide can be made of any material that totally internally reflects light.

According to another embodiment, the mobile device 905 can include a second camera, where the second camera is displaced a short distance from the first plurality of cameras 900. In various embodiments, the short distance between the two cameras roughly corresponds to the distance between a person's eyes, and in some cases mimics the distance between a person's eyes. In other embodiments, the short distance between the two cameras is reduced to almost zero, to minimize the space that the two cameras occupy on the mobile device 905. The second camera includes a second lens operable to capture a second image. The second image corresponds to a first image captured by the first plurality of cameras 900, where the second image and the first image comprise stereoscopic images. Stereoscopic images are two-dimensional images of the same scene, slightly offset, and corresponding to the left and the right eye of a viewer. When the two images are viewed by a person, the images give the impression of depth. The second camera can be a second extendable camera, can be a traditional cell phone camera, can be a cell phone camera integrated into the display, as described in this application, etc. The mobile device 905 includes a processor coupled to the second camera and the first plurality of cameras 900. The processor is operable to extract depth information based on the first image and the second image, to correct aberrations in each image, to rectify images, and to create stereoscopic images.

Figure 9B:
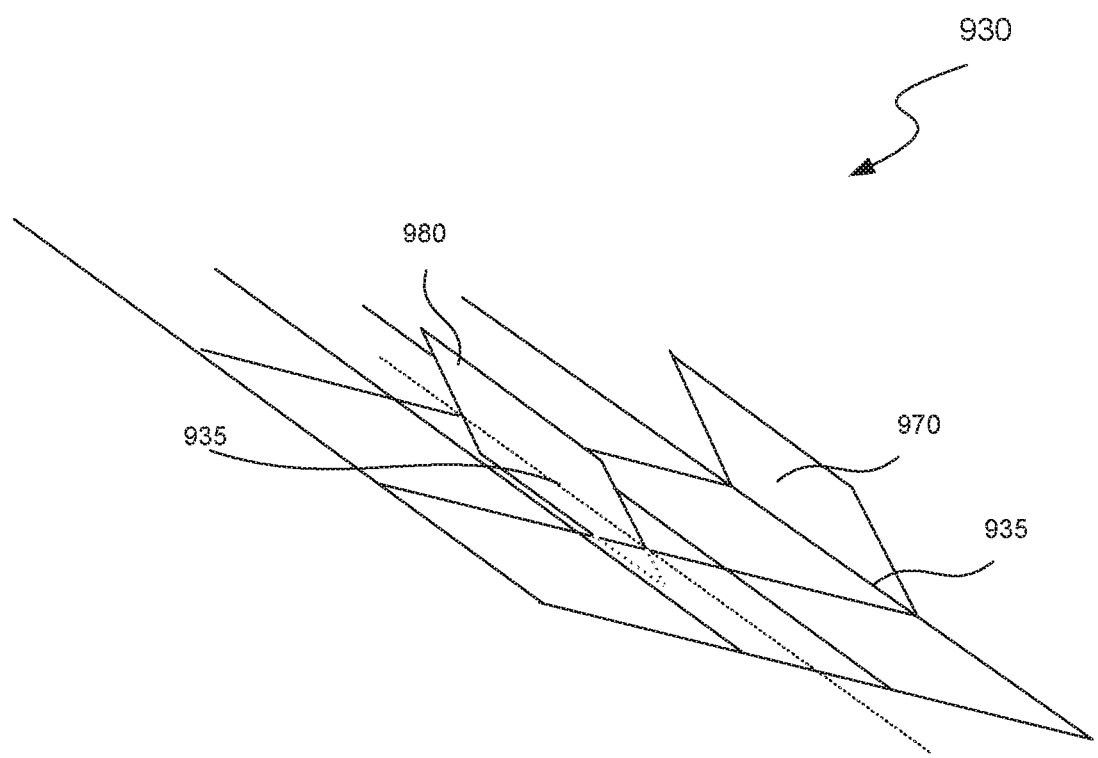
FIG. 9B shows an array of light deflectors 930, according to one embodiment.

FIG. 9B shows the array of light deflectors 930, according to one embodiment. The axis 935 associated with a light deflector in the array of light deflectors 930 can be positioned anywhere on the light deflector. For example the axis 935 can be an axis of symmetry associated with the light deflector, or can align with any of the edges associated with a light deflector in the array of light deflectors 930. For example, the axis of rotation 935 associated with the light deflector 970 is aligned with an edge associated with the light deflector 970. The axis of rotation 935 associated with the light deflector 980 is aligned with an axis of symmetry associated with the light deflector, such as a horizontal axis of symmetry, as shown in FIG. 9B. The light deflectors 970, 980 can rotate independently of the remainder of the light deflectors, as shown in FIG. 9B.

Figure 10A:
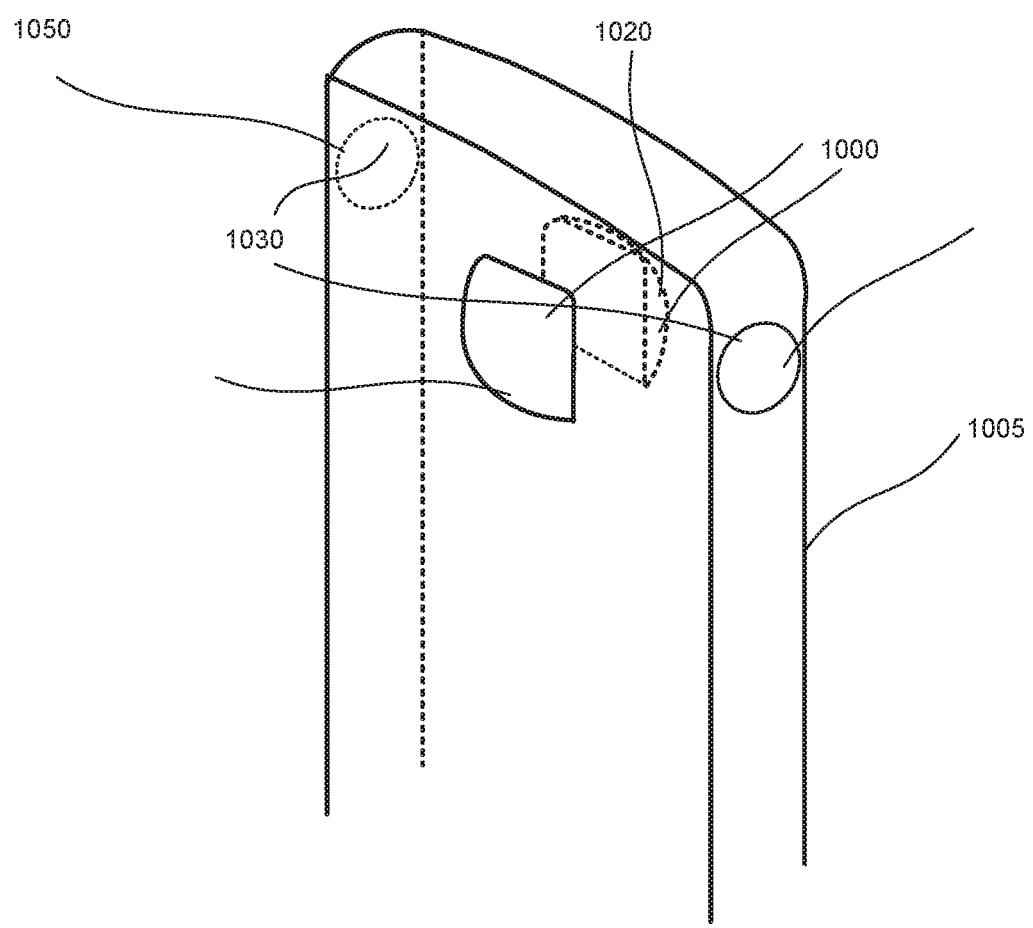
FIG. 10A shows an imaging device integrated into another device, according to one embodiment.
Figure 12A:
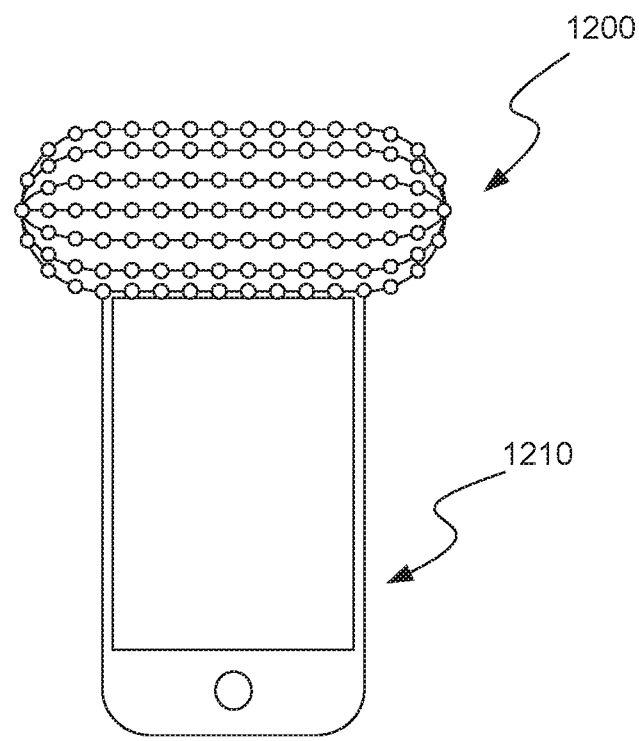
FIGS. 12A-12B show an imaging device configured to connect and/or attach to another device, according to one embodiment.

FIG. 10A shows the first plurality of cameras, and the second plurality of cameras integrated into a mobile device, according to one embodiment. The first plurality of cameras 1000 comprises two wide angle lenses 1010, and 1020. The second plurality of cameras 1030 comprises two lenses 1040, and 1050. The second plurality of cameras 1030 is disposed to record images in the region where the wide angle lenses 1010, and 1020 produce distorted images. For example, the second plurality of cameras 1030 is disposed at 90° angles with respect to the first plurality of cameras 1000, as shown in FIG. 12A. Both the first plurality of cameras 1000 and the second plurality of cameras 1030 are integrated into the mobile device. The first plurality of cameras 1000 comprises a front facing and a back facing camera associated with the mobile device 1005. The second plurality of cameras 1030 comprises side facing cameras, such as a left facing and a right facing camera.

The mobile device 1005 can comprise one or more sides. For example, the mobile device 1005 can have 6 sides, such as a standard iPhone, or an android phone, or the mobile device 1005 can be curved, for example an ellipsoid, comprising only a single side.

Figure 12B:
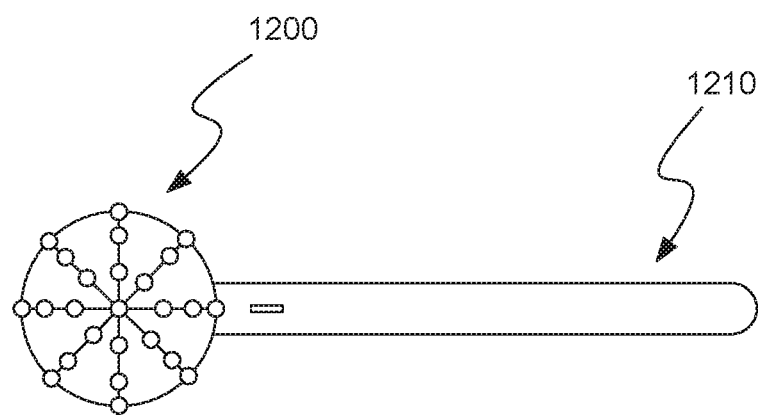

FIG. 12B is a imaging device, according to one embodiment. The imaging device comprises six sides. Two wide angle lenses 1060 are mounted on opposite sides associated with the imaging device. Four normal lenses 1070, 1072, 1074, 1076 are disposed in the middle of the remaining four sides associated with the imaging device. For edges 1090, separating sides which have normal lenses mounted on them, are equipped with an attachment mechanism, such as a rail, to accept a stand configured to support the imaging device. The stand can be an elongated selfie stick, a tripod, etc. For example, in FIG. 10B, two elongated stands 1080 are attached to edges 1090 associated with imaging device, such that the two sides comprising the edge have the normal lenses mounted on them. The angle between the stands 1080 and the edges 1090 is between 130° and 145°, so that a view of normal lenses 1070, 1074, 1076 is not blocked.

FIGS. 10C-10D show an imaging device configured to connect and/or attach to a mobile device, according to another embodiment. The imaging device 1015 includes two sides. One wide angle lens 1025 is disposed on one side associated with imaging device 1015, while a normal lens 1035 is disposed on the other side associated with imaging device 1015. The imaging device 1025 can be attached on a back side associated with the mobile device 1005, as shown in FIG. 10D. Elements 1045 is a front camera associated with the mobile device 1005.

Figure 11:
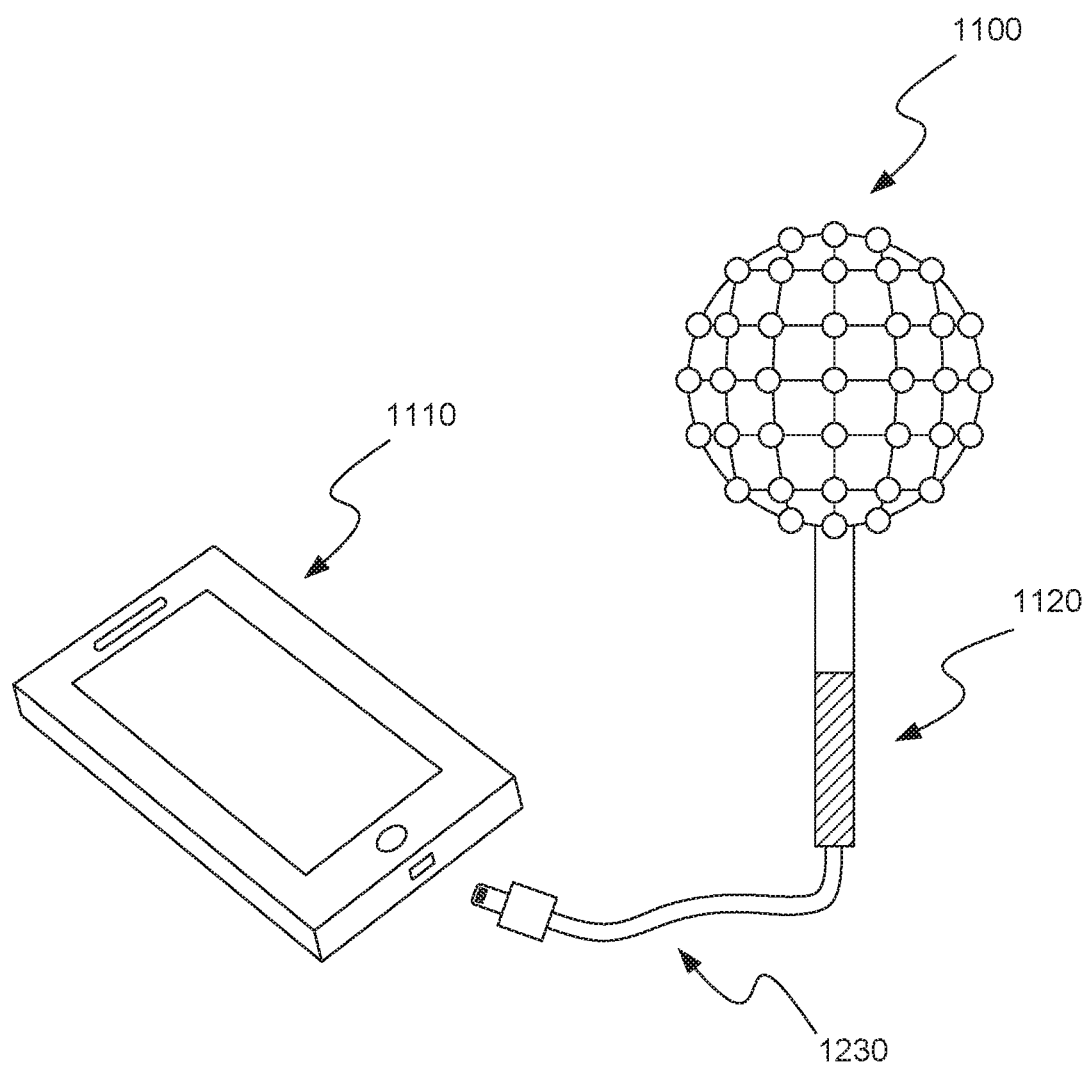
FIG. 11 shows an imaging device configured to connect and/or attach to another device, according to one embodiment.

FIG. 11 shows an imaging device 1100 configured to connect and/or attach to another device 1110, according to one embodiment. Embodiments for configuring the imaging device 1100 to connect and/or attach to various devices are contemplated. The another device 1110 can include, for example, a mobile device (e.g., a mobile phone, tablet, personal computer, manned and unmanned vehicles, camera stand and other furniture, or any combination of mobile device) and immobile devices (e.g., large objects anchored in place and incapable of movement without destruction). Examples of manned and unmanned vehicles include a car, boat, submarine, airplane, spacecraft, drone, satellite, etc. Several connections (i.e. data connections between the imaging device 1100 and the another device) and attachments (i.e. physically fastening the imaging device 1100 and the another device) described herein with reference to FIGS. 8A-12B are applicable to more than one another device.

Although FIG. 11 depicts a wired connection configuration, various connection configurations are contemplated. The imaging device 1100 can connect to another device 1110 through any wired or wireless connection, or combination of wired and/or wireless connections. For example, the imaging device 1100 can connect to another device 1110 through a universal serial bus (USB) connector (e.g., 1.0, 2.0, 3.0, 3.1, type-c, mini, micro, etc.), Apple Lightning® connector, or any other computer bus or combination of computer buses. Examples of wireless connections include one or more connections through a personal area network (PAN) device, local area network (LAN) device, wide area network (WAN) device, or any combination of wireless devices. Wireless PAN devices include, for example, Bluetooth® devices. Wireless LAN devices include, for example, WI-FI® devices. Wireless WAN devices, include, for example, 4G devices. Examples of combinations of connections include a micro USB connector and a PAN (e.g., Bluetooth®) configured to connect to another device (e.g., the mobile phone). The imaging device 1100 can be configured to connect to another device 1110 by including a connecting device (e.g., a Bluetooth® device and/or a micro USB cord) or by including a port compatible with a connecting device (e.g., a USB port).

A wired connection can provide a higher data transfer rate than a wireless connection. Embodiments of the present invention contemplate large quantities of image data that can be well suited for a wired connection. Other embodiments contemplate transferring large quantities of image data using a plurality of connections, such as a combination of wired and/or wireless connection, so that a first connection can transmit a portion of the data and another connection can transmit another portion of the data. Wireless data transfer speeds can be increased by, for example, using multiple bands.

In an embodiment, the imaging device 1100 can include an attachment mechanism. The attachment mechanism can fasten the imaging device 1100 to another device 1110. The attachment mechanism, can include, for example, an opening to receive the another device, a compression mechanism, a latch, a mobile device case, a handle, a fused surface, or any combination thereof. The attachment mechanism can also include a release mechanism to unfasten the imaging device 1100 from the another device 1110. For example, if the attachment mechanism includes a compression mechanism exerting a force on an outer surface of another device 1110 to hold the another device 1110 in place, the release mechanism can reduce or eliminate the exerted force on the outer surface of the another device 1110. The release mechanism can permit removal of the another device 1110 from the imaging device 1100.

The imaging device 1100 can include a handle 1120 attached at a base and a USB cord 1130 attached or attachable (e.g., via a USB port) at a bottom of the handle. The handle can increase a distance between a hand of a user and one or more cameras of the imaging device 1100 to reduce obstruction of the one or more cameras. A lower portion of the handle can include a grip (e.g., composed of rubber) to stabilize the imaging device 1100 during use. Stabilizing the imaging device 1100 during use can increase image quality.

Embodiments contemplate the imaging device 1100 including additional attachment features. For example, the handle 1120 can be configured to attach to a camera stand. Attaching the handle 1120 of the imaging device 1100 to a camera stand can stabilize the imaging device 1100 during use and increase image quality.

FIGS. 12A-12B show an imaging device 1200 configured to connect to another device 1210, according to one embodiment. The imaging device 1200 can connect to another device 1210 through any wired or wireless connection, or combination of wired and/or wireless connections. Examples of another devices and wired and wireless connections (and combinations thereof) are discussed above with reference to FIG. 11.

In an embodiment, image information can be output to another device 1210 by projecting an image into a camera of the another device 1210. For example, the imaging device 1200 can fit over a portion of another device 1210 including over the camera lens of the another device 1210. The imaging device 1200 can include a projector in a line of sight of the camera lens of the another device 1210. For example, the imaging device 1200 can include an opening sized for another device (e.g., a mobile phone) and a projector within the opening positioned to line up with the another device's camera lens (e.g., a mobile phone's camera lens). The projector can transmit light into the another device's camera. The another device 1210 can record image data provided by the imaging device 1200.

In an embodiment, image information can be transferred to another device 1210 by displaying an image in front of a camera of the another device 1210. For example, the imaging device 1200 can fit over a portion of another device 1210 including over the camera lens of the another device 1210. The imaging device 1200 can include a display in a line of sight of the another device's camera lens. For example, the imaging device 1200 can include an opening sized for another device (e.g., a mobile phone) and a display within the opening positioned to line up with the another device's camera lens (e.g., a mobile phone's camera lens). The display can provide an image detectable by the camera of the another device 1210.

The imaging device 1200 can be configured to attach to another device (e.g., a mobile phone and/or tablet). The imaging device 1200 can be configured to attached, for example, to a top portion, a bottom portion, and/or a side portion of another device 1210. The imaging device 1200 can include an attachment mechanism capable of fastening the imaging device 1200 to another device 1210. The attachment mechanism, can include, for example, an opening to receive the another device, a compression mechanism, a latch, a mobile device case, a handle, a fused surface, or any combination thereof. For example, the imaging device 1200 can include an opening extending a length of the imaging device 1200. The opening can include an additional attachment mechanism, such as, for example, a latch or compression device. For example, a portion (e.g., a top, bottom, or side portion) of another device 1210 can slide into the opening and remain fixed within the opening due to the additional attachment mechanism within the opening. One or more sidewalls of the opening can maintain a position of the imaging device 1200 on the another device 1210 by, for example, preventing the imaging device 1200 from sliding across the another device 1210. In an embodiment, the imaging device 1200 can be configured to attach to another device 1210 by being attached to a case configured to attach to the another device 1210. Embodiments include the imaging device 1200 and the another device 1210 being secured into a single device. For example, a surface of the imaging device 1200 can be fused to a surface of another device 1210. The imaging device 1200 and the another device 910 having a fused surface can operate as an integrated device. Embodiments include the attachment mechanism also serving as a connection mechanism. For example, the attachment mechanism can include a wired connector (e.g., a micro USB connector). The wired connector can be inserted into a port (e.g., a micro USB port) of another device 1210 which attach the imaging device 1200 to the another device.

The imaging device 1200 can extend beyond one or more outer edges of the another device 1210. For example, the imaging device 1200 can extend beyond a front edge and a back edge of the another device 1210. In an example, the imaging device 1200 can extend beyond one or more side edges of the another device 1210. By extending beyond one or more outer edges of the another device 1210, the imaging device 1200 can have a wide angle view with less obstruction from the another device 1210. For example, if the imaging device 1200 is attached to a top portion of another device 1210 and extends over a side of the another device 1210, a set of photo sensors of the array of photo sensors adjacent to the outer edges of the another device 1210 receive light beams unobstructed by the another device 1210 (e.g., light beams travelling parallel to the outer edges of the another device 1210). In other words, the imaging device 1200 can have a wide angle view extending from above the top portion of another device 1210, to a side of the another device 1210, and below another device 1210. In other words, In contrast, if the imaging device 1200 is attached to a top portion of another device and does not extend over a side of another device 1210, a view extending below the another device can be obstructed by the another device 1210.

Figure 13A:
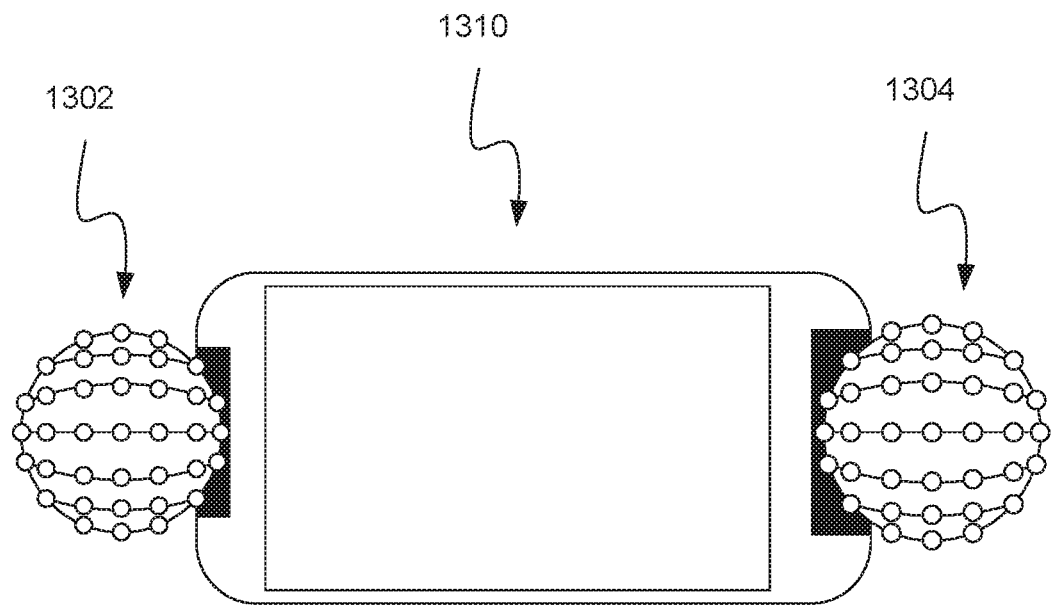
FIGS. 13A-13B show a pair of imaging devices configured to connect and/or attach to another device, according to one embodiment.
Figure 13B:
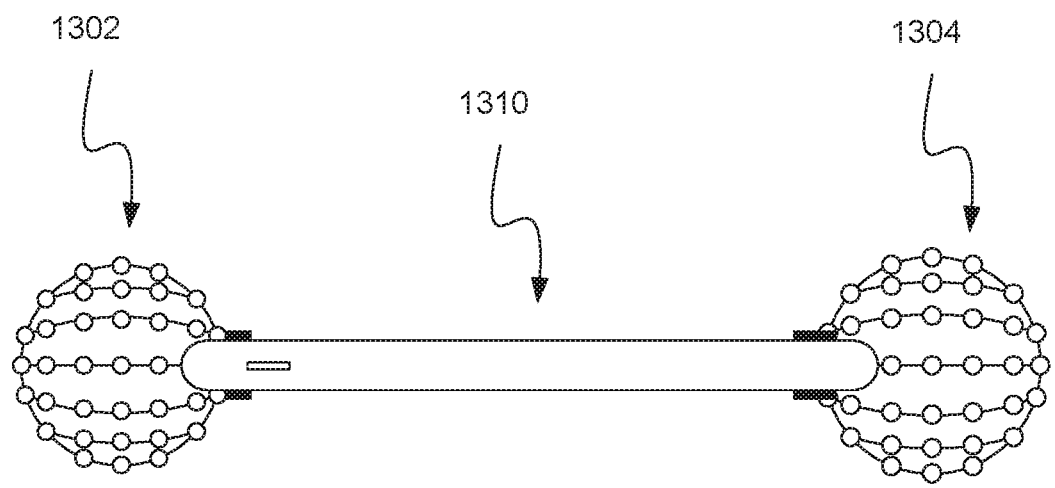

FIGS. 13A-13B show a pair of imaging devices 1302, 1304 configured to connect and/or attach to another device 1310, according to one embodiment. The pair of imaging devices 1302, 1304 can connect to another device 1310 through any wired or wireless connection, or combination of wired and/or wireless connections. Examples of another devices are discussed above with reference to FIG. 11. Examples of wired and wireless connections (and combinations thereof) are discussed above with reference to FIG. 11. Embodiments include transferring image information from the imaging device 1302 and/or the imaging device 1304 through a projector and/or a display in proximity to a camera of another device, as discussed with reference to FIGS. 12A-12B.

The pair of imaging devices 1302, 1304 can be configured to attach to another device 1310 (e.g., a mobile phone and/or tablet). The pair of imaging devices 1302, 1304 can be configured to attached, for example, to a top portion, a bottom portion, and/or a side portion of another device 1310. The pair of imaging devices 1302, 1304 can be configured to attach to a same or different portion of the device 1310.

For example, the pair of imaging devices 1302, 1304 can both be configured to attach to a top portion, a bottom portion, and/or a side portion of another device 1310. In an example, the imaging device 1302 can be configured to attach to a top portion and the imaging device 1304 can be configured to attach to a bottom portion of the another device 1310. In an example, the imaging device 1302 can be configured to attach to a side portion and the imaging device 1304 can be configured to attach to a another side portion of another device 1310. The pair of imaging devices 1302, 1304 can include an opening extending a length of the pair of imaging devices 1302, 1304. The opening can include an attaching mechanism, such as, for example, a latch or compression device. A portion (e.g., a top, bottom, or side portion) of another device 1310 can slide into the opening of imaging devices 1302, 1304 and remain fixed within the opening due to the attaching mechanism. One or more sidewalls of the opening can maintain a position of the pair of imaging devices 1302, 1304 on the another device 1310 by, for example, preventing the pair of imaging devices 1302, 1304 from sliding across the another device 1310. Embodiments include the attaching mechanism serving as a connecting device. For example, the attaching mechanism can include a wired connector (e.g., a micro USB connector). The wired connector can be inserted into a port (e.g., a micro USB port) of another device 1310 which can attach either or both of the pair of imaging devices 1302, 1304 to the another device 1310. In an embodiment, the pair of imaging devices 1302, 1304 can be configured to attach to another device 1310 by being attached to a case configured to attach to another device 1310.

Although only two imaging devices are shown in FIGS. 13A-13B, embodiments with more than two imaging devices are contemplated. For example, four imaging device can be attached to another device 1310 where an imaging device is attached to a bottom portion, top portion, a first side portion and a second side portion of the another device 1310. Attaching a number of imaging devices to another device can reduce obstructions (e.g., from the another device) in an image. A number of imaging devices can be attached to a case (e.g., a phone case, tablet case, etc.) configured for another device (e.g., a phone, tablet, etc.). One or more wired connections can be included in the case such that the imaging devices can share data through the wired connection.

Having more than one imaging device (e.g., the pair of imaging devices 1302, 1304) configured to attach to another device can reduce obstructions in an image (e.g., from the another device). For example, the imaging device 1302 on a top portion of the another device 1310 can not extend to an outer edge of a first side or a second side of the another device 1310 so a portion of a wide angle view can be obstructed by an upper surface of the another device 1310 on the first side and the second side. However, since the imaging device 1304 can be on a lower portion of the another device, the obstruction from the upper surface of the another device 1310 can be eliminated by using sophisticated image processing techniques to omit images with the obstruction captured by the imaging device 1302 and merging images captured by the imaging device 1304 to fill in the gaps to generate a wide angle view (e.g., a 360° view) of the surrounding environment without obstructions (e.g., the another device to which the imaging devices can be attached).

Computer

Figure 14:
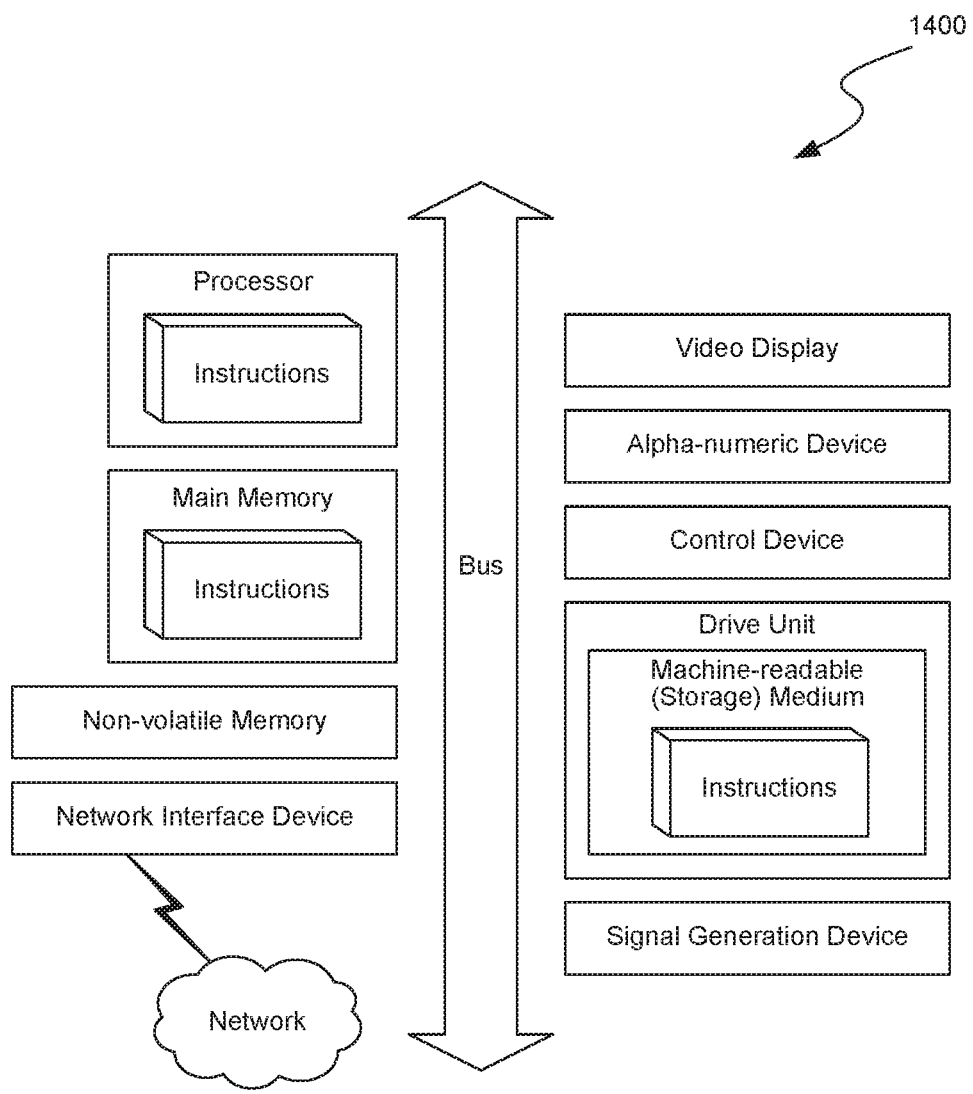
FIG. 14 is a diagrammatic representation of a machine in the example form of a computer system 1400 within which a set of instructions, for causing the machine to perform any one or more of the methods or modules discussed herein, can be executed.

FIG. 14 is a diagrammatic representation of a machine in the example form of a computer system 900 within which a set of instructions, for causing the machine to perform any one or more of the methods or modules discussed herein, can be executed.

In the example of FIG. 14, the computer system 1400 includes a processor, main memory, non-volatile memory, and a network interface device. Various common components (e.g., cache memory) are omitted for illustrative simplicity. The computer system 900 is intended to illustrate a hardware device on which any of the components described in the example of FIGS. 1-13B (and any other components described in this specification) can be implemented. The computer system 1400 can be of any applicable known or convenient type. The components of the computer system 1400 can be coupled together via a bus or through some other known or convenient device.

This disclosure contemplates the computer system 1400 taking any suitable physical form. As example and not by way of limitation, computer system 1400 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1400 can include one or more computer systems 1400; be unitary or distributed; span multiple locations; span multiple machines; or reside in a cloud, which can include one or more cloud components in one or more networks. Where appropriate, one or more computer systems 1400 can perform without substantial spatial or temporal limitation one or more steps of one or more methods described or illustrated herein. As an example and not by way of limitation, one or more computer systems 1400 can perform in real time or in batch mode one or more steps of one or more methods described or illustrated herein. One or more computer systems 1400 can perform at different times or at different locations one or more steps of one or more methods described or illustrated herein, where appropriate.

The processor can be, for example, a conventional microprocessor such as an Intel Pentium® microprocessor or Motorola PowerPC® microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disc, a read-only memory (ROM), such as a CD-ROM, EPROM, or EEPROM, a magnetic or optical card, or another form of storage for large amounts of data. This data is often written by a direct memory access process into memory during execution of software in the computer system 900. The non-volatile memory storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, it may need to be moved to a computer-readable location appropriate for processing; and for illustrative purposes, that location is referred to as the memory in this paper. Even when software is moved to the memory for execution, the processor will typically make use of hardware registers to store values associated with the software, and will make use of a local cache that ideally speeds up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1400. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 1400 can be controlled by operating system software that includes a file management system, such as a disk operating system. One example of operating system software with associated file management system software is the family of operating systems known as Windows® from Microsoft Corporation of Redmond, Wash., and its associated file management systems. Another example is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are not to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "generating," or the like, refer to the actions and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical discs (e.g., compact disc read-only memory (CD-ROMS), digital versatile discs, (DVDs), etc.), among others, and transmission type media such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device may comprise a transformation, such as a physical transformation. Rather, the foregoing is intended to provide illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An imaging device, comprising:
   an array of photo sensors disposed around an ellipsoid substrate;
   an array of lenses corresponding to the array of photo sensors, the array of lenses configured to receive a plurality of light beams and focus the plurality of light beams on the corresponding photo sensor in the array of photo sensors, wherein a first subset of the array of lenses include wide-view lenses and a second subset of the array of lenses include standard-view lenses;
   a processor configured to receive a plurality of images corresponding to the array of photo sensors, and create an image comprising a wide view of an environment around the imaging device,
   wherein a first subset of the plurality of images include wide-view images and a second subset of the plurality of images include standard images, the wide-view images having a distortion corresponding to a geometry of the wide-view lenses;
   wherein creating the image comprising the wide view includes merging pixels of the wide-view images and one or more of the standard images; and
   a connection mechanism configured to communicate with another device, wherein the communication includes transferring data associated with any of the plurality of images and the image comprising the wide view.

2. The imaging device of claim 1, the processor disposed inside the ellipsoid substrate.

3. The imaging device of claim 1, wherein the processor is further configured to:
   identify and correct distortions in the plurality of images corresponding to the array of photo sensors;
   identify overlap areas between any images of the plurality of images;
   merge corresponding pixels in the identified overlap areas, wherein the image comprising the wide view is created based on the merged corresponding pixels; and
   facilitate communication via the connection mechanism to the another device.

4. The imaging device of claim 1, wherein the connection mechanism includes any of:
   a universal serial bus (USB) connector;
   a wireless personal area network device;
   a wireless local area network device; and
   a wireless wide area network device.

5. The imaging device of claim 1, wherein the another device includes any of:
   a mobile telephone;
   a tablet;
   a personal computer;
   a manned vehicle;
   an unmanned vehicle;
   a camera stand; or
   a wall mount.

6. The imaging device of claim 1, further comprising:
   an attachment mechanism configured to fasten the imaging device to the another device.

7. The imaging device of claim 6, wherein the attachment mechanism includes any of:
   an opening to receive the another device;
   a compression mechanism;
   a latch;
   a fused surface;
   a release mechanism;
   a mobile device case; or
   a handle.

8. The imaging device of claim 7, wherein the mobile device case connects the imaging device to any of:
   a second imaging device; and
   the another device.

9. The imaging device of claim 6, further comprising:
   the attachment mechanism fastening the imaging device to the another device, wherein outer edges of the ellipsoid substrate extend beyond outer edges of the another device, wherein a set of photo sensors of the array of photo sensors adjacent to the outer edges of the another device receive light beams unobstructed by the another device.

10. The imaging device of claim 6, further comprising:
    the imaging device fastened to the another device by the attachment mechanism; and a second imaging device fastened to the another device,
wherein the second imaging device includes a second plurality of cameras configured to record a second plurality of images,
wherein the processor is further configured to receive the second plurality of images, and create the image comprising the wide view by combining the plurality of images and the second plurality of images.

11. The imaging device of claim 6, wherein the second plurality of cameras are integrated into the another device and comprise a front camera proximate to a display associated with the another device, and a back facing camera disposed in a direction opposite of the front camera.

12. The imaging device of claim 6, further comprising:
a display screen associated with the another device, wherein a portion of the display screen is occupied by the imaging device and appears to be a camera icon, the camera icon operable to activate the imaging device when the camera icon is selected.

13. The imaging device of claim 12, further comprising:
the camera icon operable to launch a camera application on the another device when the camera icon is selected.

14. The imaging device of claim 1, wherein the array of lenses are movably disposed inside a camera port of the ellipsoid substrate,
wherein the array of lenses are configured, in response to the plurality of photo sensors being inactive, to retract inside the camera port, and to align with an outer surface of the ellipsoid substrate, and
wherein the array of lenses are configured, in response to the plurality of photo sensors being active, to protrude out of the outer surface of the ellipsoid substrate, and to position the plurality of lenses to receive light unobstructed by the ellipsoid substrate.

15. An imaging device comprising:
a plurality of photo sensors arranged to receive light from 360° around the imaging device, wherein light received by the plurality of photo sensors is used to generate a plurality of images, wherein a first subset of the array of lenses include wide-view lenses and a second subset of the array of lenses include standard-view lenses;
a processor configured to receive the plurality of images, combine any of the plurality of images, and create an image comprising a wide view of an environment around the imaging device,
wherein a first subset of the plurality of images include wide-view images and a second subset of the plurality of images include standard images, the wide-view images having a distortion corresponding to a geometry of the wide-view lenses;
wherein creating the image comprising the wide view includes merging pixels of the wide-view images and one or more of the standard images;
a connection mechanism configured to communicate with another device, wherein the communication includes transmitting image data associated with any of the plurality of images and the image comprising the wide view to the another device; and
an attachment mechanism configured to fasten the imaging device to the another device.

16. The imaging device of claim 15, the processor disposed inside the imaging device.

17. The imaging device of claim 15, wherein the processor is disposed inside the another device and is configured to receive the plurality of images from the connection mechanism.

18. The imaging device of claim 15, wherein the attachment mechanism includes any of:
an opening to receive the another device;
a compression mechanism;
a latch;
a fused surface;
a release mechanism;
a mobile device case; or
a handle.

19. The imaging device of claim 18, wherein the mobile device case connects the imaging device to any of:
a second imaging device; and
the another device.

20. The imaging device of claim 15, further comprising:
the attachment mechanism fastening the imaging device to the another device, wherein outer edges of the imaging device extend beyond outer edges of the another device, wherein a set of photo sensors of the plurality of photo sensors adjacent receive light beams unobstructed by the another device.

21. A method, comprising:
disposing an array of photo sensors on a curved three-dimensional surface, wherein the array of photo sensors substantially covers the curved three-dimensional surface;
configuring a plurality of lenses proximate to the array of photo sensors to receive a plurality of light beams and to focus the plurality of light beams on the array of photo sensors, wherein a first subset of the array of lenses include wide-view lenses and a second subset of the array of lenses include standard-view lenses;
configuring a processor connected to the array of photo sensors to receive a plurality of images corresponding to the array of photo sensors, and to create an image comprising a wide field of view of an environment around the curved three-dimensional surface,
wherein a first subset of the plurality of images include wide-view images and a second subset of the plurality of images include standard images, the wide-view images having a distortion corresponding to a geometry of the wide-view lenses;
wherein creating the image comprising the wide view includes merging pixels of the wide-view images and one or more of the standard images; and
configuring a connection mechanism to communicate with another device, wherein the communication includes transferring data associated with the image comprising the wide field of view.

22. The method of claim 21, wherein the processor is disposed inside the curved three-dimensional surface.

23. The method of claim 21, wherein configuring the processor comprises:
configuring a first processor within the curved three-dimensional surface to compress the plurality of images by identifying redundancies in the plurality of images; and
configuring a second processor within the another device to receive the compressed plurality of images and to create the image comprising the wide field of view,
wherein the connection mechanism facilitates communication between the first processor and the second processor.

24. The method of claim 21, wherein the processor is further configured to:
identify and correct distortions in the plurality of images corresponding to the array of photo sensors;
identify overlap areas in the plurality of images;

merge corresponding pixels in the identified overlap areas, wherein the image comprising the wide view is created based on the merged corresponding pixels; and facilitate communication via the connection mechanism to the another device.

25. The method of claim 21, further comprising:

configuring an attachment mechanism to fasten the curved three-dimensional surface to the another device.

26. The method of claim 21, further comprising:

fastening, by an attachment mechanism, the curved three-dimensional surface to the another device; and communicating, by the connection mechanism, with the another device.

* * * * *